United States Patent
Warner et al.

(10) Patent No.: US 7,844,650 B2
(45) Date of Patent: Nov. 30, 2010

(54) PULSE OUTPUT DIRECT DIGITAL SYNTHESIS CIRCUIT

(75) Inventors: William Dean Warner, Maple Ridge (CA); Richard Edmund Ryan, Vancouver (CA)

(73) Assignee: PMC Sierra Inc., Santa Clara, CA (US)

( * ) Notice: Subject to any disclaimer, the term of this patent is extended or adjusted under 35 U.S.C. 154(b) by 855 days.

(21) Appl. No.: 11/754,325

(22) Filed: May 28, 2007

(65) Prior Publication Data

US 2007/0276891 A1 Nov. 29, 2007

Related U.S. Application Data

(60) Provisional application No. 60/808,791, filed on May 26, 2006.

(51) Int. Cl.
G06F 1/02 (2006.01)
H03B 21/00 (2006.01)

(52) U.S. Cl. ........................ 708/271; 327/105

(58) Field of Classification Search ............... 708/270, 708/271
See application file for complete search history.

(56) References Cited

U.S. PATENT DOCUMENTS 4,672,329 A 6/1987 Hikawa (Continued)

FOREIGN PATENT DOCUMENTS

WO WO03/027847 4/2003

OTHER PUBLICATIONS

Michael S. McCorquodale, Mei Kim Ding, Richard B. Brown, "Top-Down and Bottom-Up Approaches to Stable Clock Synthesis" International Conference on Electronic Circuits and Systems, Sharjah, United Arab Emirates pp. 575-579 2003.

(Continued)

Primary Examiner—Chuong D Ngo
(74) Attorney, Agent, or Firm—Mark M. Friedman

(57) ABSTRACT

A clock signal generator responsive to a frequency control word and a reference clock signal having a reference clock frequency $f_{ref}$. The clock signal generator generates an output clock signal having a frequency $f_{gen}$, wherein $f_{gen}$ is less than $f_{ref}$. A modulo-N counter accepts the reference clock signal as input. The modulo-N counter generates a phase-indication signal of the reference clock. The phase indication signal has N clock phases repeating at a frequency of $f_{ref}/N$. An accumulator iteratively accumulates a frequency control word into a modulo-N adder and produces an accumulated value. One or more bits of the accumulated value is fed-back into the modulo-N adder for adding modulo N to the accumulated value in the next iteration. N of the modulo-N adder is the same integer as in the modulo-N counter. A clock edge selector receives as inputs the phase indication signal and one or more bits of the accumulated value and by comparing the inputs selects an edge of the reference clock signal upon which to toggle the state of the output clock signal. The clock edge selector preferably selects the edge from: (i) only rising edges of the reference clock signal, (ii) only falling edges of the reference clock signal or (iii) both rising and falling edges of the reference clock signal. The clock edge selector selects between a rising edge and a falling edge of the reference clock signal preferably based on one or more bits of the accumulated value.

15 Claims, 9 Drawing Sheets

U.S. PATENT DOCUMENTS

| | | |
|---|---|---|
| 5,160,894 A | 11/1992 | Westwick |
| 5,394,106 A * | 2/1995 | Black et al. .................. 327/107 |
| 5,528,308 A | 6/1996 | Alelyunas et al. |
| 5,673,212 A | 9/1997 | Hansen |
| 5,812,832 A | 9/1998 | Horne et al. |
| 5,931,891 A | 8/1999 | Landry |
| 5,974,891 A * | 11/1999 | Uchikawa et al. ............. 73/625 |
| 6,064,241 A | 5/2000 | Bainton et al. |
| 6,107,843 A * | 8/2000 | de Gouy et al. ............. 327/105 |
| 6,642,754 B1 | 11/2003 | Dobramysl et al. |
| 7,242,225 B2 * | 7/2007 | Klage ......................... 327/106 |
| 2003/0058004 A1 | 3/2003 | Stengel et al. |

OTHER PUBLICATIONS

Goldberg, Bar-Giora, Digital Frequency Synthesis Demystified: DDS and fractional-N PLLs, LLY Technology Publishing, 1999.

* cited by examiner

Exemplary Relation between Control Input and Generated Clock Assuming a 467 MHz Reference Clock Exemplary Relation between Frequency Accuracy of Generated Clock and Bit Resolution of Control Word

PULSE OUTPUT DIRECT DIGITAL SYNTHESIS CIRCUIT

CROSS REFERENCE TO RELATED APPLICATIONS

The present application claims the benefit from U.S. provisional application Ser. No. 60/808,791 filed 26 May 2006 by the present inventors.

FIELD AND BACKGROUND OF THE INVENTION

The present invention relates to direct digital synthesis (DDS) and particularly to a power and/or speed efficient pulse output DDS circuit. Specifically, the device is used to generate one or more clock signals for digital circuitry whereas the generated clock signals can have frequencies less than but arbitrarily relative to the frequency of the reference clock signal.

In many applications, it is necessary to generate multiple clock signals for clocking of digital circuits that process different streams of data at distinctly and/or subtly different rates. In those applications in which a suitable clock signal is not provided with each data stream, a local clock signal often needs to be generated and recovered from the data stream. An exemplary system that demonstrates this need is a multi-port receiver such as in a T3/E3/STS-1 line card. Each of the multiple ports must be capable of receiving and recovering data arriving at slightly different rates relative to the other ports; the rates are plesiochronous. Furthermore, it is possible that some of the ports are receiving STS-1 rate (51.84 MHz) data while other ports are receiving T3 rate (44.736 MHz) data. Clock signals are not supplied with the data signals, so clock signals must be generated locally within the receiver to process each data stream.

A classic system 10 for generating a suitable clock signal is depicted in FIG. 1a. An oscillating circuit 101 (e.g a ring oscillator or a crystal oscillator) designed to function at an approximate desired frequency is used to clock digital circuit 103. Through various means, digital circuit 103 (or optionally accompanying analog circuitry) adjusts the frequency of operation of the oscillating circuit such that the oscillating frequency matches the frequency of the received signal and is phase aligned appropriately to support digital processing.

For multi-port systems, a system 11 as illustrated in FIG. 1b may be used for generating multiple required clock signals by simply replicating system 10 for a single clock signal generator. A drawback to system 11 is that multiple independent oscillating circuits are required. For a highly integrated multi-port device, system 11 is relatively expensive and commercially uncompetitive.

Reference is now made to FIG. 2 which illustrates a prior art system 12, for generating multiple clock signals. In order to decrease cost and provide a competitive advantage, a pulse output Direct Digital Synthesis (DDS) clock generating or pulse output circuit 105 can be used. A "classic" DDS circuit typically outputs a sine wave. Pulse output DDS 105 is a simplified version of the classic DDS and generates a square wave signal (i.e., a clock) at the desired frequency. In system 12, multiple pulse output DDS circuits 105 are required, but only one reference oscillator 101 is required, as each pulse output DDS circuit 105 can use the same reference clock.

Reference is now made to FIG. 3, illustrating the structure of a classic DDS circuit 104 generating a sine-wave. DDS circuit 104 assumes that the output sine wave has a substantially lower frequency than the reference clock. An n-bit modulus $-2\pi$ counter (adder 201 with feedback) and phase register 203 are implemented in circuit 104 as a phase accumulator 205 connected to a phase/amplitude lookup table or converter 207. A digital control word M of n bits is loaded into phase register 203. Phase accumulator is actually a modulus $2\pi$ counter that increments its stored number by digital word M each time it receives a clock pulse. The sine wave oscillation is visualized as a vector rotating around a phase circle. Each point on the phase circle corresponds to an equivalent point in the cycle of the sine waveform. As the vector rotates around the circle, a corresponding output sine wave is being generated. One revolution of the vector around the phase circle at a constant speed, results in one complete cycle $2\pi$ of the output sine wave. The number of available discrete phase points contained in the circle is determined by the resolution, or number of bits n, of phase accumulator 205. Phase accumulator 205 is utilized to provide the equivalent of the vector's rotation around the phase circle by increments of M. The contents of phase accumulator 205 correspond to the points on the cycle of the output sine wave. The output of phase accumulator 205 is linear and cannot directly be used to generate a sine wave or any other waveform except a ramp. Therefore, phase-to-amplitude (e.g. cosine) lookup table 207 is used to convert a truncated version (e.g. p most significant bits) of instantaneous output value of phase accumulator 205 into the sine wave amplitude information that is presented to the digital to analog (D/A) converter (not shown). The output of the digital to analog converter is filtered to produce the desired frequency sine wave (or cosine wave).

For use in digital circuit clocking, square waves are typically preferred over sine-waves, especially if clock jitter is an issue. Reference is now made to FIG. 4 which illustrates a prior art circuit 105 for generation of a clock signal. Circuit 105 is often called a pulse output DDS. The generic structure of a DDS circuit 104 is easily modified to produce a clock output. Instead of mapping the "p" most significant bits of phase accumulator 205 to a cosine table, a much simpler mapping can be used. When phase accumulator 205 represents a phase in the interval $[0, \pi)$, the clock output is set to "1". When phase accumulator 205 represents a phase in the interval $[\pi, 2\pi)$, the clock output is set to "0".

DDS circuits 104, 105 (for sine wave or pulse output) can be operated in open loop (i.e. free-run) or closed loop mode. In open loop mode, the ability to generate precise frequencies is affected by the resolution (number of bits n) of accumulator 205 and the frequency control word M. Depending on the relationship between the reference frequency $f_{ref}$ and the desired output frequency, it may be possible to generate the exact required frequency with only a few bits of accumulator resolution; however, this is not the general case. Usually, it is not possible to generate the exact desired frequency with a finite resolution of the frequency control word M and accumulator 205. However, increasing the resolution N of accumulator 205 will decrease the achievable frequency error. In closed-loop mode, an external circuit or entity determines whether an increase or decrease in output frequency is needed and the frequency control word M is adjusted accordingly. As a result, the frequency control word is effectively dithered about some nominal value and any desired output frequency can be generated exactly. In this case, the resolution of accumulator 205 will impact the purity of the generated clock. With a lower resolution (smaller N) accumulator, more dithering of the accumulator control word M will generally be required resulting in an increased output clock jitter. With a higher resolution accumulator, less dithering of the accumulator control word M will be necessary and the resulting output clock will have less jitter. Dithering of the frequency control word about some nominal desired value is not restricted to closed loop operation. It is also possible to generate and apply a pre-determined dithering pattern to the frequency control word to improve the long-term average frequency of the generated clock.

In circuit 105, accumulator 205 is clocked at the reference clock rate, which can be significantly higher than frequency $f_{gen}$ of the desired output clock signal. As the number of multiple independent clocks to be generated increases, and/or the required reference clock frequency $f_{ref}$ increases, and/or the required resolution of accumulator 205 increases, operating accumulator 205 at the reference clock frequency becomes challenging from either a size/power competitive viewpoint, or from the viewpoint of being able to synthesize a working circuit in the desired digital gate technology.

There is thus a need for, and it would be highly advantageous to have a pulse output DDS circuit that has superior operating characteristics relative to prior art pulse output DDS circuit 105 and particularly for practical digital devices in which multiple non-related clocks are required, such as a multi-port T3/E3 receiver in which each port is plesiochronous with each other.

Current state of the art of DDS circuits for clock generation is represented by the following publications, incorporated herein by reference for all purposes as if entirely set forth herein:

U.S. Pat. No. 5,673,212, Sep. 30, 1997, Robert Karl Hansen, "Method and Apparatus for Numerically Controlled Oscillator with Partitioned Phase Accumulator"

U.S. Pat. No. 6,064,241, May 16, 2000, Bainton et al., "Direct Digital Frequency Synthesizer using Pulse Gap Shifting Technique"

U.S. Pat. No. 6,642,754, Nov. 4, 2003, Dobramysl et al., "Clock Signal Generator Employing a DDS Circuit"

US Patent Application 20030058004, Mar. 27, 2003, Stengel et al. "Method and Apparatus for Direct Digital Synthesis of Frequency Signals" . . . same disclosure also filed as PCT WO03/027847, Apr. 3, 2003

U.S. Pat. No. 5,673,212 describes a sinewave generating DDS circuit. The disclosure recognizes that the accumulator can be partitioned into two parallel accumulators: one for the Most Significant Bits (MSBs), and one for the Least Significant Bits (LSBs). Moreover, the accumulator for the LSBs can be clocked at a slower speed than the accumulator for the MSBs. The CO (Carry Out) bit of the LSB accumulator is applied to the CI (Carry In) of the MSB accumulator. As a result, the MSB accumulator that is operating at the reference clock frequency has a reduced bit width, simplifying the implementation for use with higher speed reference clocks.

U.S. Pat. No. 6,064,241 is a DDS based clock generator that addresses the issue of clocking the accumulator circuit by the high speed reference clock. The approach taken provides for the n-bit signed adder of the phase accumulator circuit to operate at a rate that is an integer sub-multiple of the reference clock, not at a rate equal to the reference clock frequency as with classic DDS circuits. The purpose of the phase accumulator circuit is to occasionally alter the operation of the Phase Shifter. Normally, the Phase Shifter outputs "I" output clock pulses for every "I+1" pulses of the high speed reference clock. The operation of the Phase Accumulator is to periodically adjust the value of "I" by +1 or −1. The output clock from the Phase Shifter is further divided by 6 to provide the final generated output clock. For applications in which the desired output clock has a frequency that is close to $f_{ref}I/((6\cdot(I+1))$, where $f_{ref}$ is the frequency of the high speed reference clock, and where I is a positive integer, the described disclosure may be useful.

U.S. Pat. No. 6,642,754 is another DDS based clock generator that addresses the issue of clocking the accumulator circuit by the high-speed reference clock. The approach taken is to have a cascade of two DDS circuits. A coarse DDS circuit is run at a sub-multiple of the reference clock frequency. The accumulator overflow of the coarse DDS indicates approximately when a clock output pulse should be generated. The output clock jitter of this DDS is typically too large, so a cascaded fine DDS circuit is used to improve the timing of the generated clock pulses. The fine DDS is operated at the reference clock frequency, but since it only operates when the coarse DDS overflows, the current consumption of the whole circuit is kept at a level only slightly higher than that of the coarse DDS portion. In this disclosure, the precision of the circuit operation is determined by the fine DDS circuit which is clocked at the high-speed reference clock frequency.

US Patent Application 2003/0058004 is yet another DDS based clock generator that addresses the classic DDS issue of clocking the accumulator circuit by the high-speed reference clock. This disclosure represents the ratio of the reference clock frequency to the generated output clock frequency as $f_{ref}/f_{gen}=N_{integer}+R_{fractional}$. Furthermore, a counter is operated at the reference clock rate, and when the count exceeds $N_{integer}$, it triggers a fractional accumulator that accumulates the value $R_{fractional}$. The trigger output from the counter also triggers the generation of a clock pulse, with refinement of the temporal location of the pulse using information provided by the accumulation of $R_{fractional}$. Whenever a clock pulse is generated, the counter is reset. When the accumulator exceeds a value of $R_{fractional}=1$, it is reset to a value of: $R_{fractional}-1$. Therefore, the disclosure effectively partitions the circuit into a high speed portion counting the pulses of the reference clock, and a slow speed portion that only operates when the counter exceeds a defined threshold.

SUMMARY OF THE INVENTION

The terms "accumulation" and "phase accumulation" are used herein interchangeably. The terms "word" and "value" are used herein interchangeably and refer to quantities stored or transmitted electronically in a binary digital representation.

According to the present invention there is provided a clock signal generator responsive to a frequency control word and a reference clock signal having a reference clock frequency $f_{ref}$. The clock signal generator generates an output clock signal having a frequency $f_{gen}$, wherein $f_{gen}$ is less than $f_{ref}$. A modulo-N counter accepts the reference clock signal as input. The modulo-N counter generates a phase-indication signal of the reference clock. The phase indication signal has N clock phases repeating at a frequency of $f_{ref}/N$. An accumulator iteratively accumulates a frequency control word into a modulo-N adder and produces an accumulated value. One or more bits of the accumulated value is fed-back into the modulo-N adder for adding modulo N to the accumulated value in the next iteration. N of the modulo-N adder is the same integer as in the modulo-N counter. A clock edge selector receives as inputs the phase indication signal and one or more bits of the accumulated value and by comparing the inputs selects an edge of the reference clock signal upon which to toggle the state of the output clock signal. The clock edge selector preferably selects the edge from: (i) only rising edges of the reference clock signal, (ii) only falling edges of the reference clock signal or (iii) both rising and falling edges of the reference clock signal. The clock edge selector selects between a rising edge and a falling edge of the reference clock signal preferably based on one or more bits of the accumulated value. An analog circuit is preferably connected to the clock edge selector which corrects jitter of the output clock signal based one or more bits of the accumulated value. The frequency control word preferably includes a dynamic control value. A dynamic control interface is connected to the accumulator for inputting the dynamic control value, which dynamically controls output clock frequency $f_{gen}$. The dynamic control interface is preferably an asynchronous interface and a timing module attached to the accumulator times the input of the dynamic control value into the accumulator thereby removing external timing requirements. An increase of the value of N, typically decreases the minimum achievable output clock frequency $f_{gen}$ without affecting the absolute jitter in the output clock signal.

According to the present invention there is provided a system including multiple clock signal generators as disclosed herein and the same reference clock signal is used for all the clock signal generators. According to the present invention there is provided a receiver including a clock signal generator as disclosed herein.

According to the present invention there is provided a method for generating an output clock signal responsive to a frequency control word and a reference clock signal having a reference clock frequency $f_{ref}$, the output clock signal having a frequency $f_{gen}$, wherein $f_{gen}$ is less than $f_{ref}$. The reference clock signal is input into a modulo-N counter thereby generating a phase-indication signal of the reference clock. The phase indication signal has N clock phases repeating at a frequency of $f_{ref}/N$. A frequency control word is iteratively accumulated into a modulo-N adder, thereby producing an accumulated value. One or more bits of the accumulated value is fed back into the modulo-N adder for adding modulo N to the accumulated value in the next iteration. The phase indication signal and one or more bits of the accumulated value is received as inputs. Upon comparing the inputs an edge of the reference clock signal is selected for toggling the state of the output clock signal and the state of the output clock signal is toggled on the selected edge of the reference clock signal. Upon completing the toggling, another iteration of accumulation is initiated. The frequency control word preferably includes a dynamic control value. The dynamic control value is varied to dynamically adjust the output clock frequency $f_{gen}$. The dynamic adjustment of output clock frequency $f_{gen}$ preferably includes dithering the output clock frequency $f_{gen}$ thereby substantially reducing spurious noise of the output clock signal. The dynamic control value is preferably scaled with a scaling factor between zero and one.

According to the present invention there is provided a multiple-port communications receiver comprising multiple receivers sharing a single reference clock signal having a reference clock frequency $f_{ref}$. For each of the receivers an analog-to-digital converter receives and samples an input analog signal thereby generating an input digital signal. A timing detection circuit processes the input digital signal and outputs dynamically a dynamic control value. A clock signal generator is responsive to the dynamic control value and outputs an output clock signal having a frequency $f_{gen}$, wherein $f_{gen}$ is less than $f_{ref}$. A modulo-N counter accepts the reference clock signal as input. The modulo-N counter generates a phase-indication signal of the reference clock. The phase indication signal has N clock phases repeating at a frequency of $f_{ref}/N$. An accumulator iteratively accumulates a frequency control word into a modulo-N adder and produces an accumulated value. One or more bits of the accumulated value is fed-back into the modulo-N adder for adding modulo N to the accumulated value in the next iteration. N of the modulo-N adder is the same integer as in the modulo-N counter. A clock edge selector receives as inputs the phase indication signal and one or more bits of the accumulated value and by comparing the inputs selects an edge of the reference clock signal upon which to toggle the state of the output clock signal. The output clock signal is input to the analog-to-digital converter, and sampling of the analog-to-digital converter is frequency and phase locked to the input digital signal.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1A:
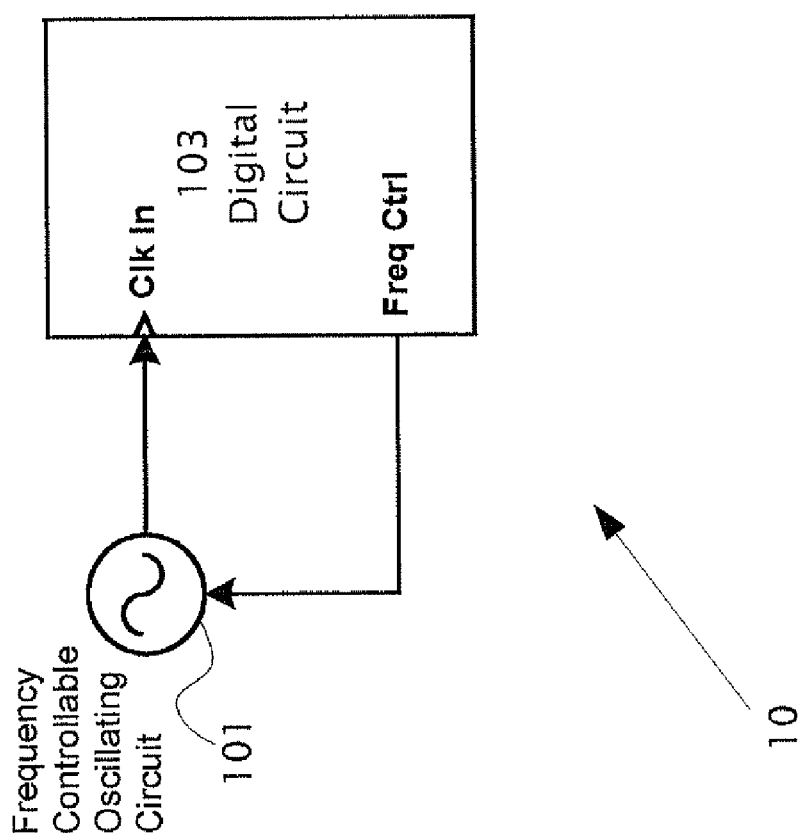
FIG. 1a is a drawing of a conventional circuit for generating a clock signal.
Figures 1B, 2:
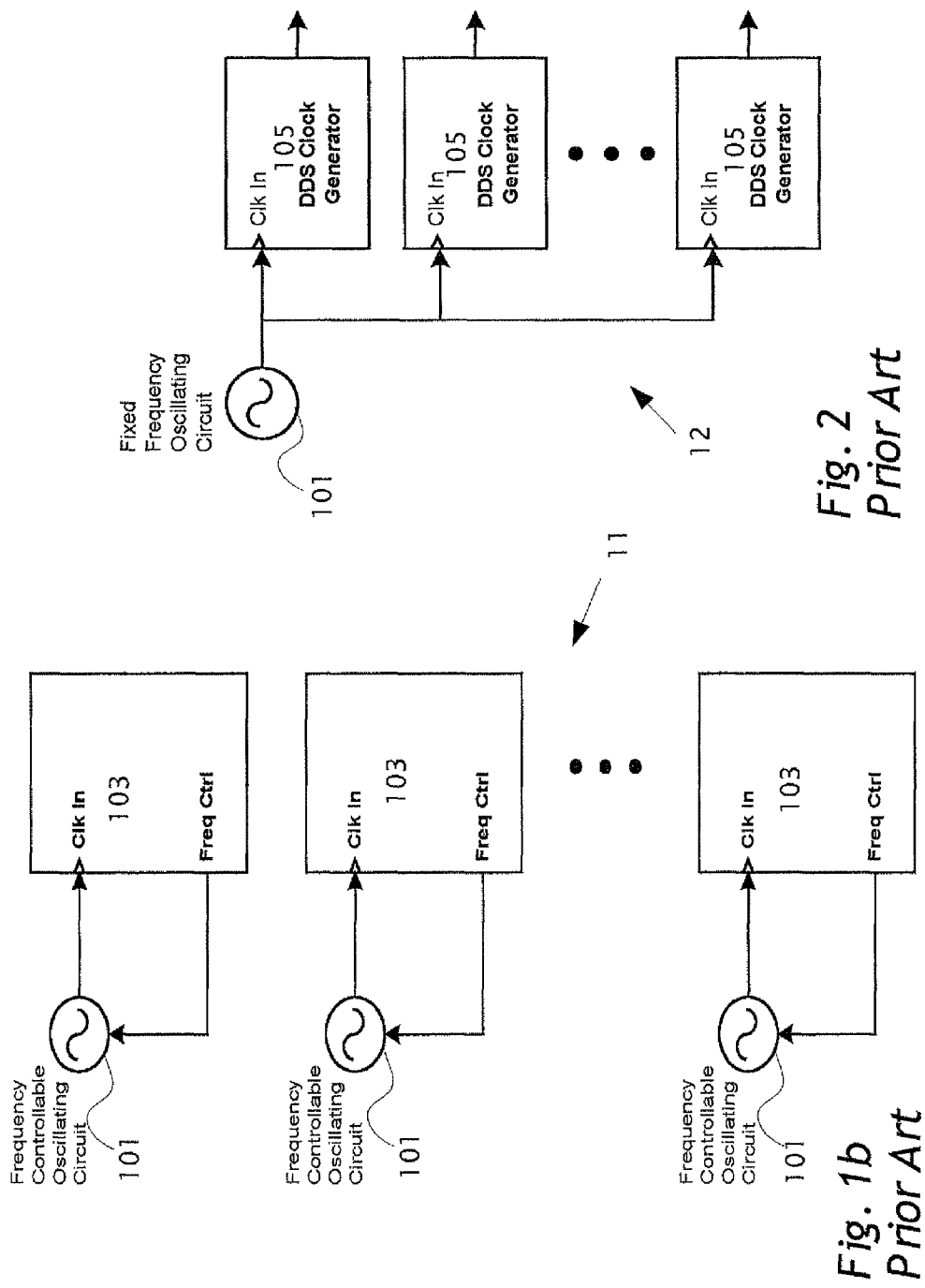
FIG. 1b is a drawing of a conventional circuit for generating multiple clock signals.
FIG. 2 illustrates a prior art system for generating multiple clock signals.
Figure 3:
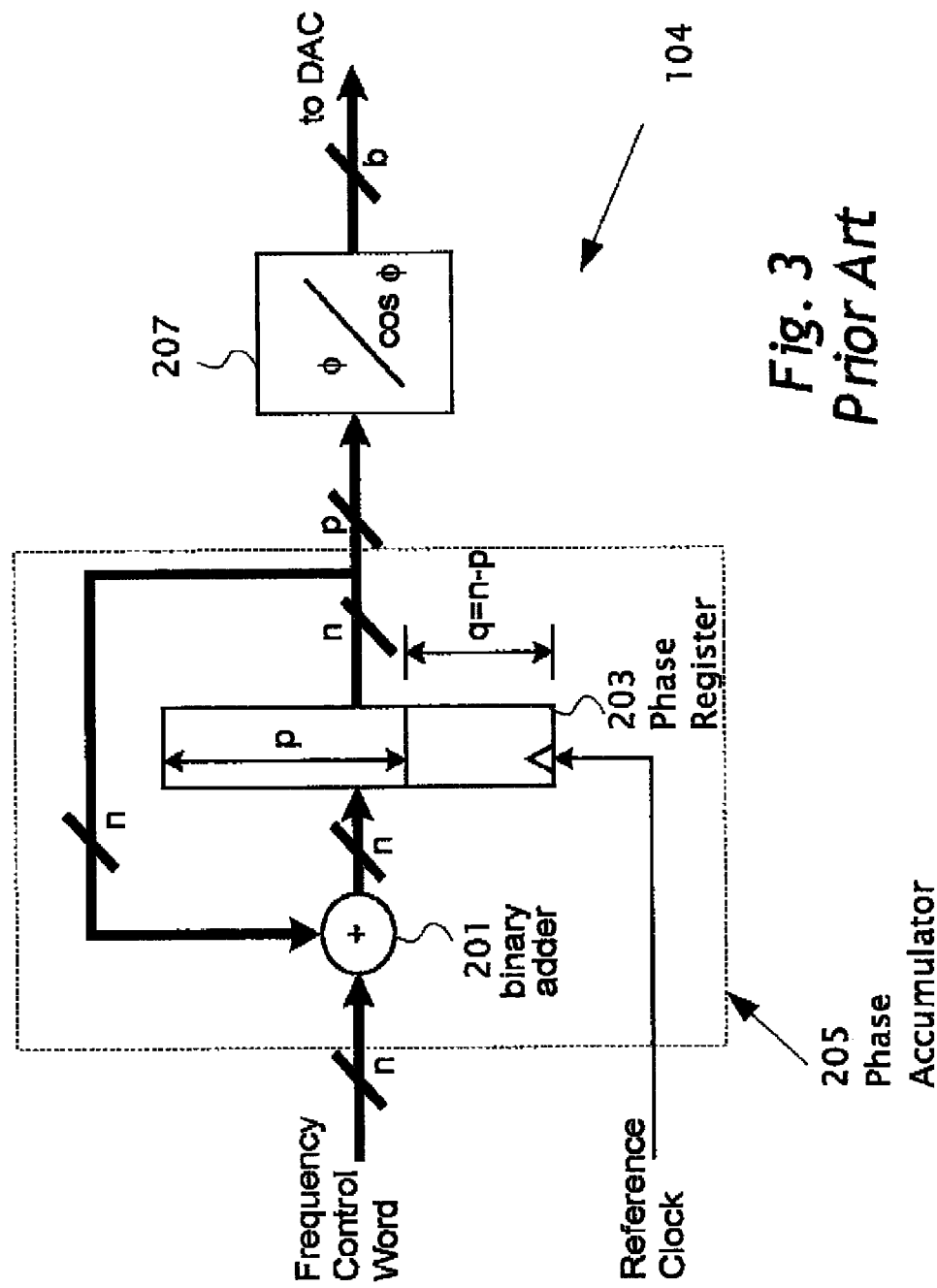
FIG. 3 illustrates a prior art DDS circuit for generating a sine-wave.
Figure 4:
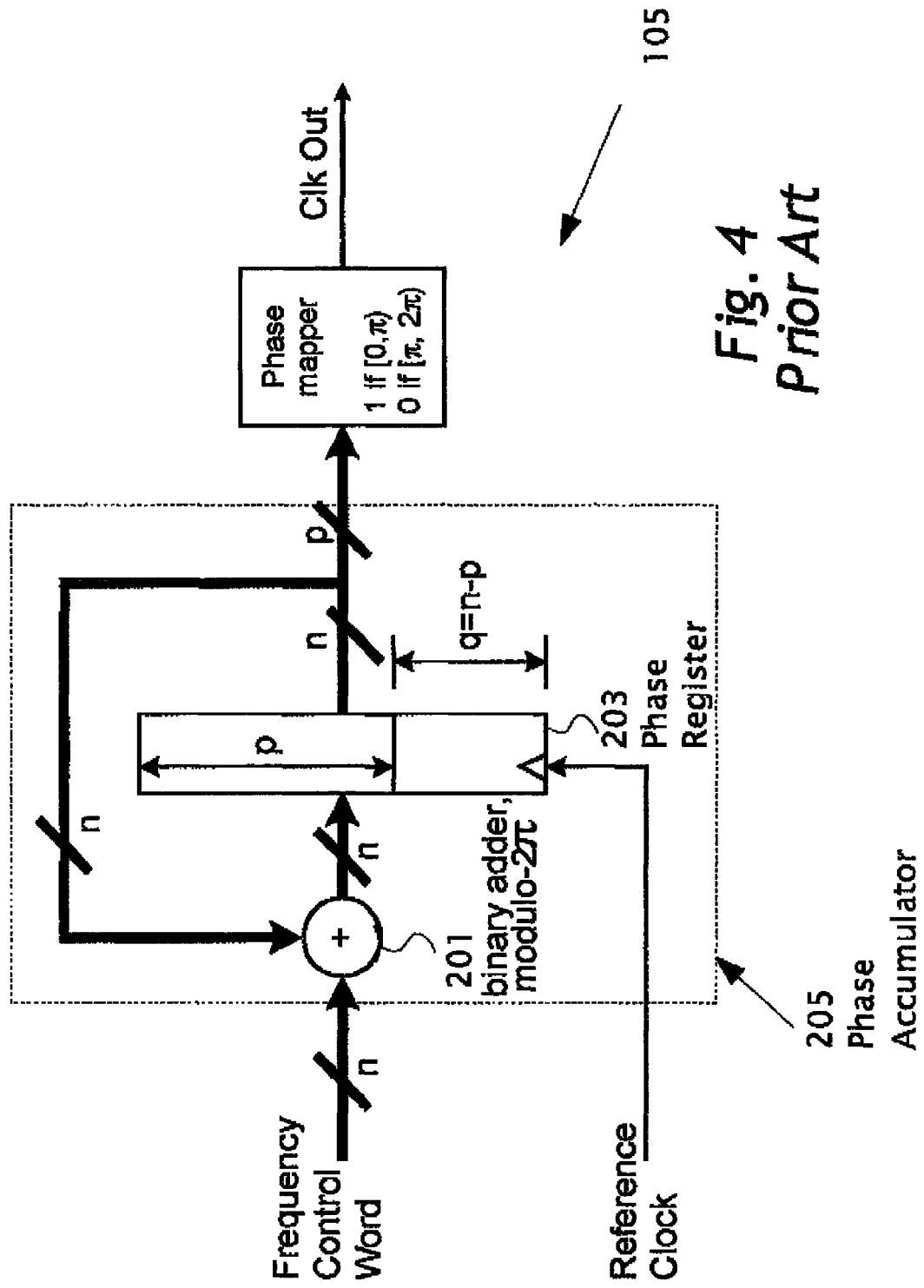
FIG. 4 illustrates a prior art DDS circuit for generating a pulsed output.

The present invention is of a circuit and method for generating one or more pulse outputs using a direct digital synthesis circuit with superior operating characteristics. Specifically, pulse output DDS circuit of the present invention is useful for digital devices in which multiple non-related clock signals are required.

The principles and operation of a system and method for generating one or more pulse outputs using a direct digital synthesis circuit with superior operating characteristics, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, a principal intention of the present invention is to implement pulse output DDS circuits that: are efficient with respect to power requirements and operating speed, are completely synthesizable, allow operation at higher reference clock frequencies, allow operation at higher output clock frequencies, are real-time frequency adjustable making the circuits suitable for use in a recovered clock generation application, scale easily for use in generating multiple independent clocks using a single reference clock, allow design reuse for a variety of reference and generated clock frequencies, are easily portable between technologies and minimize power draw.

Figure 5:
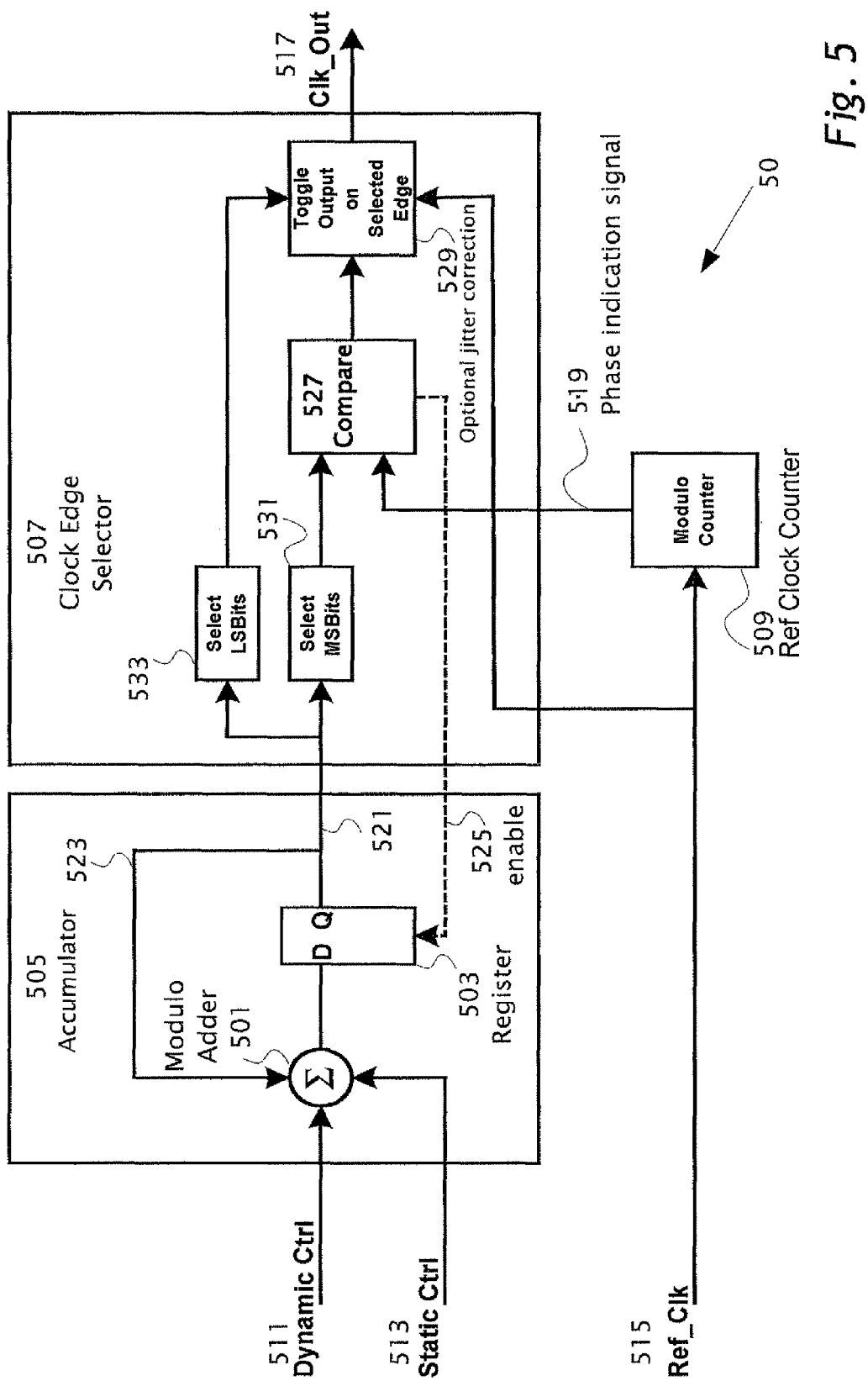
FIG. 5 illustrates a simplified block diagram of a pulse output direct digital synthesis circuit and method, according to an embodiment of the present invention.

Referring now to the drawings, FIG. 5 illustrates a simplified block diagram of a pulse output direct digital synthesis circuit 50, and method according to an embodiment of the present invention.

There are three external inputs to circuit 50, and one output.

Clk_Out signal 517 is the generated output clock signal having the desired frequency.

A Ref_Clk input 515 is the high speed reference clock preferably of known frequency, from which generated clock signal 517 is derived.

The Static_Ctrl input 513 is a configuration control word that is used to set the frequency of generated clock signal 517.

The Dynamic_Ctrl input 511 is also a control word that is preferably used, according to embodiments of the present invention, to dynamically adjust the frequency of the generated clock signal 517 and can be used to induce fine adjustments of the frequency of the generated clock signal 517. The dynamic adjustment is similar to a voltage control input to a voltage controlled crystal oscillator (VCXO). Dynamic control input 511 is preferably separate from the static control input 513 to facilitate dynamic adjustment of the frequency of generated clock signal 517 in embodiments of the present invention, such as in clock recovery of digital receivers. Alternatively, static_ctrl input 513 and dynamic_ctrl input 511 are implemented with a single control input, e.g. digital word that includes a static and dynamic control component and replaces the frequency control word as used in circuits 104 and 105.

Pulse output direct digital synthesis circuit 50, according to an embodiment of the present invention includes three primary functional blocks:

Ref Clock Counter 509
Accumulator 505
Clock Edge Selector 507

The primary functional blocks are defined above for illustrative purposes only in order to facilitate understanding of the functional operation of the present invention and do not limit the scope of the invention. In different implementations of the present invention the functional blocks may be grouped differently.

Figure 6:
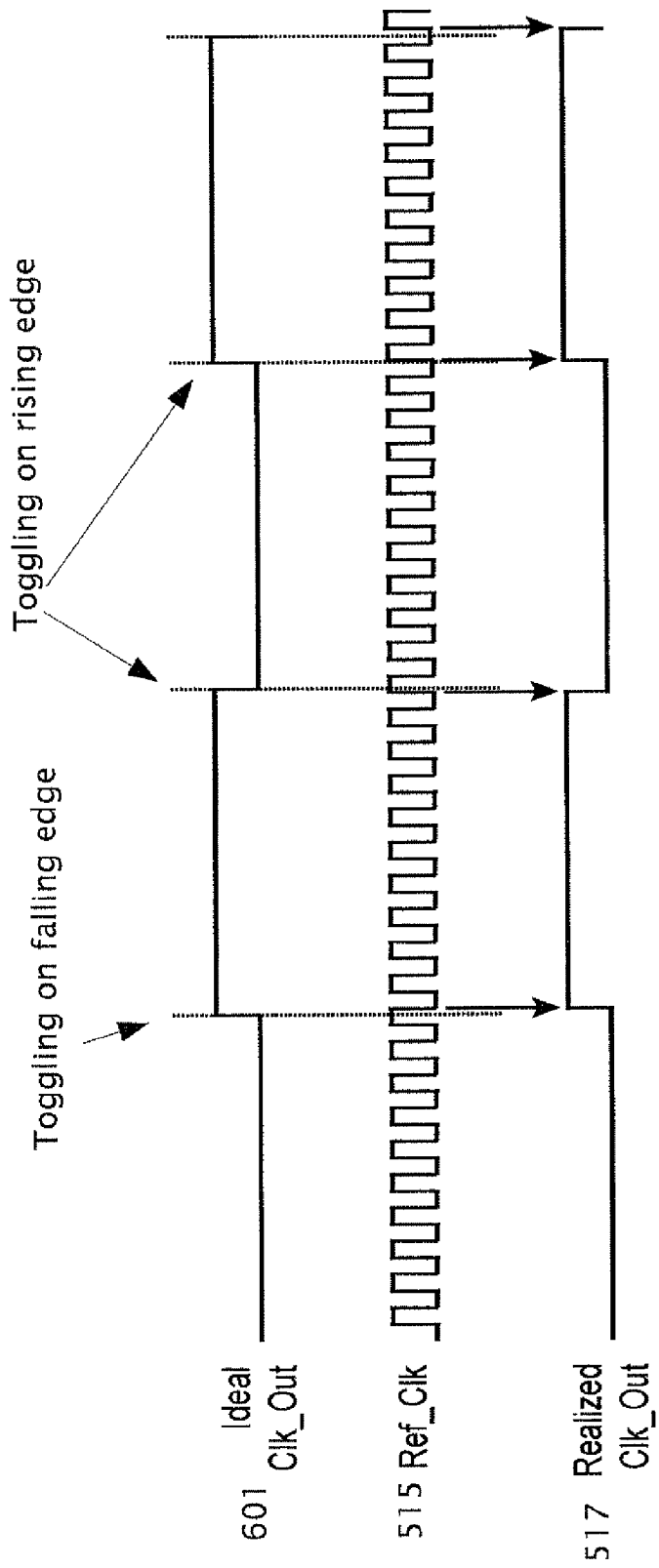
FIG. 6 shows a graph which illustrates conceptually operation of embodiments of the present invention FIG. 7 includes a graph illustrating an example of the tunable frequency range of an embodiment of the present invention.

Operation of an embodiment is illustrated conceptually using the graph shown in FIG. 6. Given that the desired frequency of an ideal output clock 601 is known, and the frequency of Ref_Clk input 515 is known, the rising and/or falling edges of reference clock Ref_Clk input 515 that most closely match the rising and/or falling edges of ideal output clock 601 can be determined. Toggling an output line on the identified edges of the reference clock 515 then generates the realized output clock Clk_Out signal 517. Toggling of generated clock 517 is preferably performed both on rising and falling edges of reference clock 515, as shown in the graph of FIG. 6. Allowing for output clock 517 to be toggled on rising and falling edges of the reference clock 515 enables a reduction in the resulting output clock jitter. In the case where reference clock 515 has a 50% duty cycle, and the circuitry (block 529) toggling output clock 517 responds equally fast to rising and falling edges of reference clock 515, the amount of output clock jitter can be reduced by half. In other embodiments of the present invention, the output clock toggling circuitry 529 can be simplified if the output clock 517 is toggled only on the rising or falling edge of reference clock 515, but not on both, at the expense of increased output clock jitter relative to the dual (rising and falling) edge toggling technique.

Referring back to FIG. 5, reference clock counter block 509 counts the number of rising (or falling) edges of the reference clock, and does so in a modulo-N fashion (e.g., 0, 1, 2, . . . 30, 31, 0, 1, 2, . . . etc. for N=32). In a preferred embodiment of the present invention, rising edges of reference clock 515 are used to increment the modulo-N counter. Upon reaching a value of N−1, the modulo-N counter outputs a value of 0 upon the next rising edge of reference clock 515. Therefore, reference clock counter 509 sequentially outputs numbers between 0 and N−1. For purposes of this description, this output can be considered as an indication signal 519 of the phase of reference clock 515.

Accumulator block 505 is responsible for identifying at which phase of reference clock 515 is generated output clock signal 517 to be toggled. According to an embodiment of the present invention, frequency control word, e.g sum of static control word 513 and dynamic control word 511, relates the period of reference clock 515 to the period of the generated clock 517. Typically, the period of generated clock 517 is an integral number of reference clock periods plus typically a fractional part of the period of reference clock 515. Therefore, repeated accumulation of the frequency control word value provides a measure of phase alignment for consecutive edges of generated output clock 517 with reference clock 515. The accumulation of the frequency control word is performed using a modulo-N adder 501, where N is the same as in reference clock counter block 509. Given the period of reference clock 515, the period of the desired output clock 601, and the value N of modulo adder 501, the number of reference clock periods between edges of the desired generated output clock 601 can be determined to an arbitrary accuracy assuming a number representation with a sufficient number of bits n.

Modulo-adder 501 of the accumulator circuit always increases in value until it exceeds the specified modulo count value N. When the modulo count value N is exceeded, the integer portion of the integrated value is replaced with its modulo-N value and the fractional portion is preserved.

The value of N selected for the modulo-N counter of the Ref Clock Counter block 509 and modulo adder 501 of accumulator 505 determines the maximum number of Ref_Clk 515 clock periods that span half the period of the desired output clock signal 601. As a result, for a given Ref_Clk frequency 515, increasing N decreases the lower limit of the frequency of generated clock signal 517.

The integral portion of accumulated value 521 indicates in which specific period of reference clock 515, generated output clock 517 is toggled. The fractional portion of accumulated value 521 provides phase information within the specific period that can be used to improve the temporal accuracy of the edge of generated output clock 517. For example, in a preferred embodiment the most significant fractional bit can be used by clock edge selector block 507 to select either the rising edge or falling edge of reference clock 515 for toggling of generated output clock 517, thereby improving the temporal accuracy of the edges of the generated output clock. In a preferred embodiment the accumulated value 521 is stored in a register 503. The accumulated value 521 of register 503 is provided to clock edge selector block 507 and is also fed back (signal 523) to modulo-adder 501 within accumulator block 505. The summing of the stored value and the frequency control word value in modulo adder 501 must be complete prior to clock edge selector block 507 requesting the next accumulated value. Request of the next accumulated value 521 is performed using an "enable" signal 525.

Those knowledgeable in digital circuit design, especially using RTL, will recognize that the minimum effective operating rate of prior art accumulator 205 for prior art direct digital synthesis is two times the frequency of the generated output clock, based on the well known Nyquist criterion for sampled systems. In comparison, accumulator 505 according to embodiments of the present invention occurs at a lower rate than is possible using prior art pulse output DDS circuit 105. This is a key performance advantage of embodiments of the present invention since accumulation at the higher rate may be difficult to achieve with many bits of resolution.

Clock Edge Selector block 507 compares in compare block 527 preferably the integral portion, e.g. most significant bits (block 531), of accumulated value 521 from accumulator 505 to phase indication signal 519 as output from reference clock counter 509. When the integral portion of the accumulated value corresponds to or equals the phase as indicated in phase indication signal 519 then clock edge selector block 507 toggles in block 529 generated output clock 517 on the next rising or falling edge of reference clock 515.

When optionally enabled, edge selector block 507 toggles in block 529 and selects between a rising and a falling edge of reference clock 515 for generating output clock 517. The choice in block 529 of toggling of generated output clock 517 on either the rising or falling edge of reference clock 515 depends preferably on the fractional portion, e.g least significant bits (block 533) of accumulated value 521 output from accumulator 505, and typically the most significant bit of the least significant bits (block 533). When clock edge selector block 507 toggles (in block 529) generated output clock 517, clock edge selector block 507 also requests, e.g. by enabling (signal 525) accumulator 505 to output next accumulated value 521.

Referring back to accumulator 505, the frequency control word is separated into Static_Ctrl input 513 and Dynamic_Ctrl input 511. In a preferred embodiment of the present invention, Static_Ctrl input 513 is configured to be the number of periods of the reference clock 515 that spans half the period of the desired generated output clock 601, and sets the free run (e.g. in open loop) frequency of the generated output clock 517. The Static_Ctrl input 513 directly affects the period of generated output clock 517. An increase in the Static_Ctrl value 513 causes a decrease in the frequency of the generated output clock 517.

The Dynamic_Ctrl input 511 is used to adjust the frequency of the generated output clock 517 typically in closed loop applications. Its purpose and function can be compared to the control voltage applied to a VCO as part of a PLL circuit.

In a preferred embodiment of the present invention, positive values of Dynamic_Ctrl 511 are typically intended to increase the frequency of the generated output clock, therefore, the numerical sign of Dynamic_Ctrl input 511 is inverted before applying Dynamic_Ctrl input 511 to the modulo adder 501 within accumulator 505. Static_Ctrl value 513 is always positive while Dynamic_Ctrl value 511 can be positive or negative. However, in a preferred embodiment, the value of Dynamic_Ctrl 511 should always be less than Static_Ctrl value 513.

One way of allowing for lower generated clock frequencies is to provide a lower frequency reference clock 515. However, the jitter in generated output clock 517 is, at best, approximately +/− one quarter of the period of reference clock 515 when operating in the dual-edge mode, or approximately +/− half of the period of reference clock 515 when block 529 toggles the generated output clock on rising-only or falling-only edges of reference clock 515. As the frequency of reference clock 515 is lowered, the amount of absolute jitter as measured in seconds peak-to-peak will increase. Conversely, as the frequency of reference clock 515 is increased, the absolute jitter of generated clock 517 will decrease.

A second way of allowing for lower generated clock frequencies is to increase the value of N for modulo-N counter 509 and modulo adder 505 of accumulator 505. Increasing N has the added benefit that for a given reference clock frequency, output clock signals 517 of lower frequency can be generated without increasing the absolute jitter in generated output clock 517.

Figure 7:
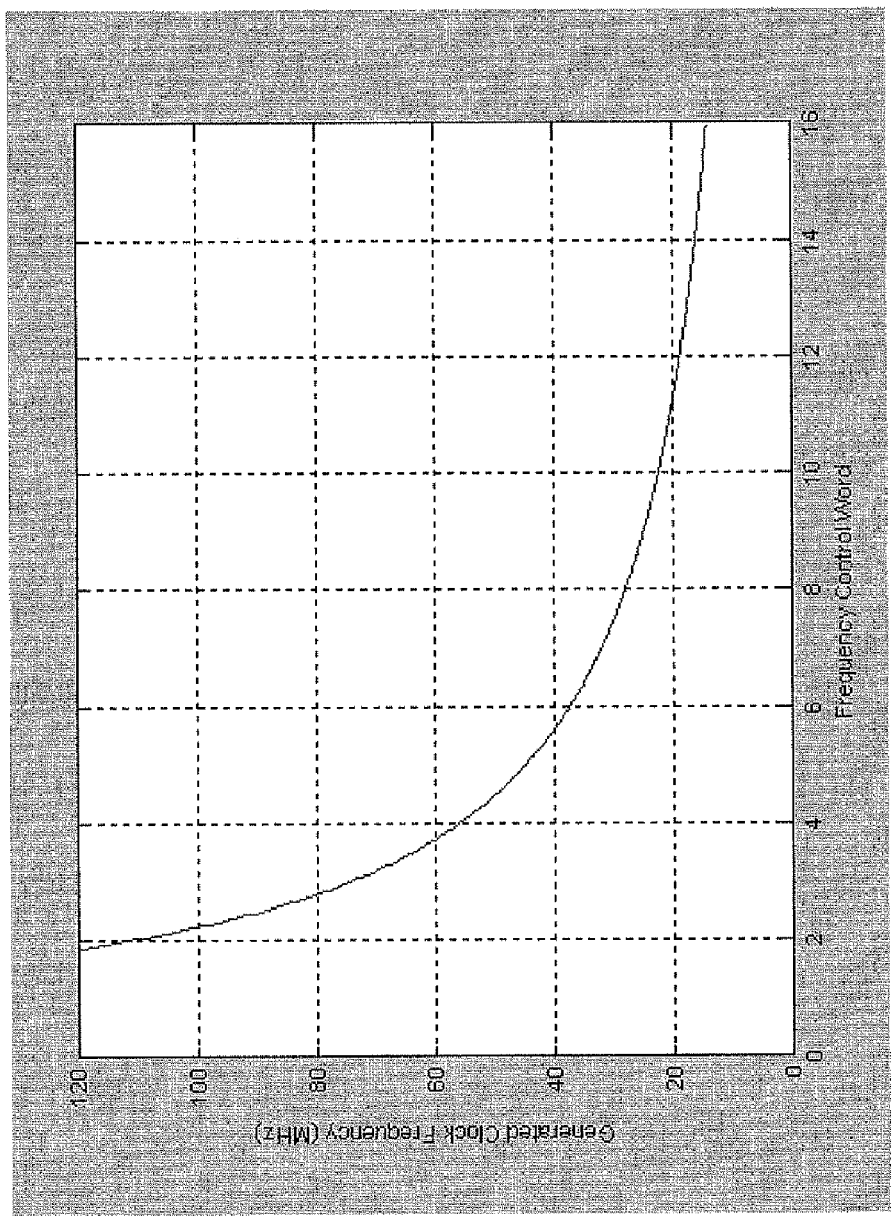

Reference is now made to FIG. 7 which includes a graph illustrating an example of the tunable frequency range of an embodiment of the present invention. As shown in FIG. 7, there is a non-linear relationship between the value of the frequency control word (sun of the Static_Ctrl 513 and Dynamic_Ctrl 511 values) and the resulting generated clock frequency. In the particular example given, the frequency of reference clock 515 is 467 MHz. The frequency $f_{gen}$ of generated clock 517 is predicted by the following equation:

$$f_{gen} = \frac{f_{ref}}{2 \cdot CTRL} \quad \text{Equation 1}$$

where $f_{ref}$ is the frequency of the supplied reference clock 515 and CTRL is the value specified by the sum of the Static_Ctrl 513 and Dynamic_Ctrl 511 values.

If the frequency $f_{ref}$ of Ref_Clk input 515 is not known, then it is not possible to generate output clock signal 517 with a known frequency $f_{gen}$. However, the ratio of the generated clock frequency $f_{gen}$ to the reference clock frequency $f_{ref}$ is known and is configurable to a large range of values less than 1. The lower limit on the ratio of the frequency of generated clock signal 517 to the frequency of reference clock signal 515 is dictated by the largest number that can be represented by the frequency control word, CTRL, e.g. sum of Static_Ctrl input 513 and Dynamic_Ctrl input 511. The theoretical upper limit on the clock ratio is 1, however, the relative jitter, normalized to Unit Intervals (UI) increases with an increasing value of the frequency control word CTRL. Therefore, a specific application may limit the acceptable frequency control word to values significantly less than 1.

In general, the accuracy to which the frequency of generated output clock 517 can be controlled is limited by the bit resolution of the Dynamic_Ctrl 511 and Static_Ctrl 513 values, and the bit resolution of the modulo-adder 501 within accumulator block 505. Bit resolution can be a critical issue if a specific embodiment of the invention is required to operate in an open loop fashion in which frequency control word CTRL is static and a specific generated clock frequency is required. Equation 2 can be manipulated to determine the generated clock frequency accuracy achievable for different degrees of precision, i.e. number of bits n, of the CTRL, e.g. sum of Static_Ctrl input 513 and Dynamic_Ctrl input 511 and modulo-adder 501 as follows:

$$ppm_{err} \simeq \frac{CTRL - \text{quantize}(CTRL)}{CTRL} \quad \text{Equation 2}$$

where the bit precision of the CTRL value and Accumulator 505 forces a quantization of the ideal CTRL value.

Figure 8:
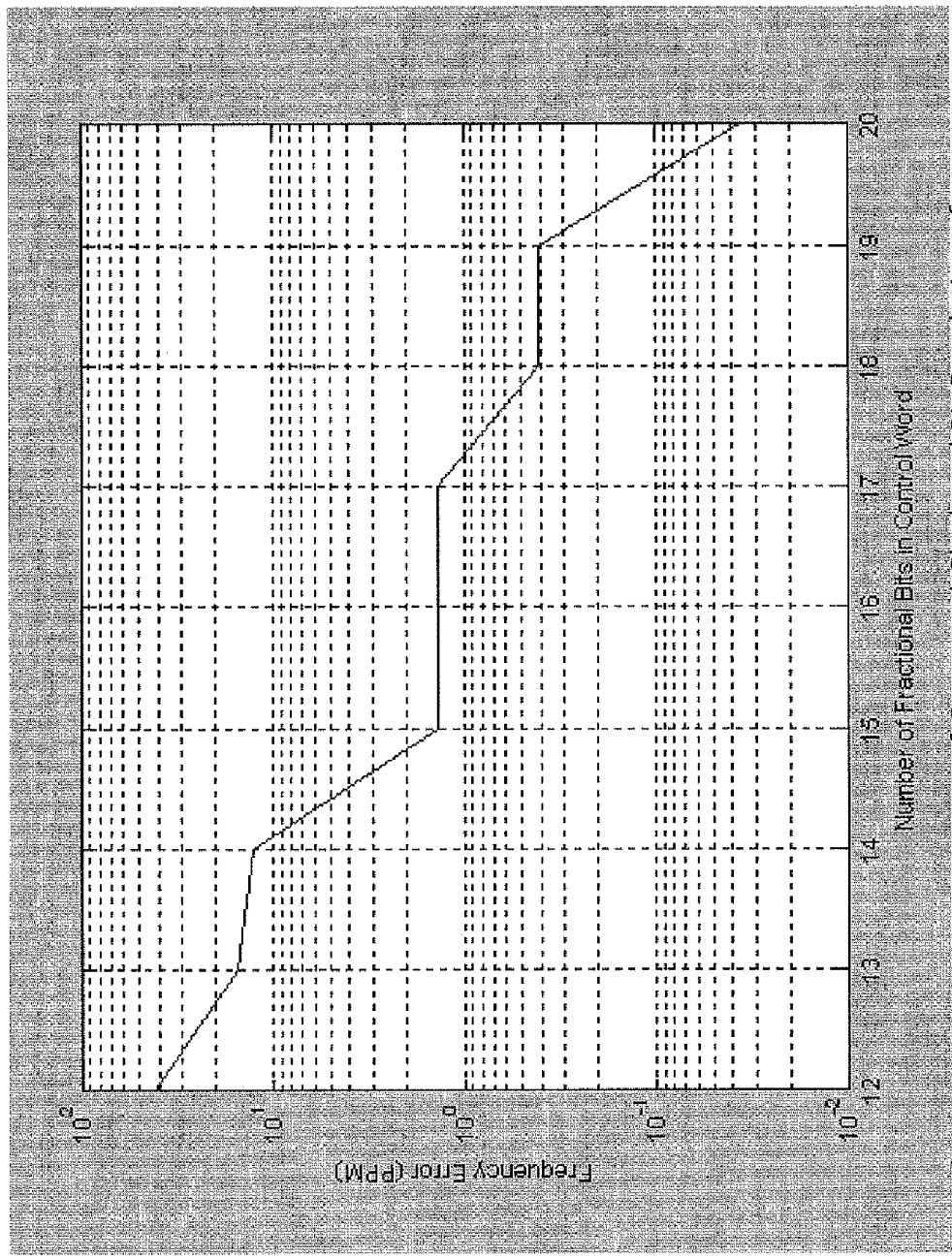
FIG. 8 includes a graph of frequency error in parts per million (ppm) as abscissa against the number of bits in the frequency control word.

The result of an exemplary analysis is provided in a graph of FIG. 8 of frequency error in parts per million (ppm) as abscissa against the number of fractional bits in control word CTRL as ordinate. In the example, the reference clock has a frequency of 466.56 MHz and a generated clock frequency of 68.736 MHz is desired. The figure clearly shows that the accuracy of the generated clock frequency improves with increasing number of fractional bits in the control word.

There are a number of extensions and variations to the digital synthesis circuit 50 that may be appropriate for different specific applications.

For closed loop operation, such as in a clock recovery application, the frequency control range is typically much smaller than the center frequency of operation. Therefore, the typical range of values of Dynamic_Ctrl 511 is much smaller than the value of Static_Ctrl 513. In these situations, it may be advantageous to apply a scaling factor ($\alpha$<1) to Dynamic_Ctrl value 511 before applying to the summing node 501. This will have the benefit of reducing the bit width requirement of the Dynamic_Ctrl interface, and reducing the effective Ko of the clock generator The variable Ko is taken from analog phase locked loop (PLL) theory in which Ko is defined as the VCO gain factor and measured in rads/sec/Volt.

Static_Ctrl values 513 can be stored internal to circuit 50 if there are known defaults. Furthermore, the internal memory can be modified through a generic digital interface. This reduces the need to have Static_Ctrl input explicitly defined on the interface. Additionally, multiple pre-computed Static_Ctrl values could be stored internally for typical operating cases.

Dynamic_Ctrl interface may be an asynchronous interface with re-timing provided by the circuit 50. This would remove specific timing requirements between external circuits providing the Dynamic_Ctrl values and circuit 50.

A single instance of the reference clock counter 509 can be used with multiple instances each of accumulator 505 and clock edge selector 507. Unless there is a great discrepancy in required clock generation frequencies, there is no need to have multiple dedicated reference clock counter blocks 509 each dedicated for a specific output clock signal 517. A single instance can provide the required reference clock phase information to multiple or all instances of the clock edge selector blocks 507 in a multiple clock generation application.

Application to Spurious Noise Reduction Clocking Systems

In some applications, the use of a clock signal, e.g reference clock 515 of which the frequency is static results in the generation of excessive RF spurious signals due to the concentration of spurious energy at integer multiples of the clock frequency. In these cases, it is common to dither the clock frequency so that the generated spurious noise is not concentrated at specific frequencies, but rather spread across a range of frequencies. This clocking technique is often referred to as spread spectrum clocking. Embodiments of the present invention are suitable for use in spread spectrum clocking in which the frequency of the clock is intentionally dithered to decrease the magnitude of radiated energy at multiples of the clock frequency.

Embodiments of the present invention are ideally suited for dynamic adjustment of the instantaneous output clock frequency. Embodiments of the present invention may be applied to generation of a clock signal with a pre-determined variation of the instantaneous frequency (i.e. frequency modulation).

Application to Hybrid Clock Generation Systems for Improved Jitter Specifications An embodiment of the present invention generates a clock signal 517 with jitter characteristics that are dependent on the reference clock frequency and the generated output clock frequency. Clock generation is completely synthesizable, using the edges of reference clock 515 to generate the edges of output clock 517, the peak-to-peak jitter of generated output clock 517 is up to ½ of the period of high-speed reference clock 515.

For applications in which this amount of jitter is unacceptable, embodiments of the present invention can be extended with an analog circuit which adjusts the temporal alignment of each generated output clock edge. Referring to FIG. 5, the least significant bits output (block 533) from accumulator 505 provides information on the desired temporal location of each output clock edge. In an embodiment of the present invention, the most significant of least significant bits (block 533) is used to select a rising or falling edge of the high-speed reference clock for generation of the output clock edge. Alternatively, all of least significant bits (block 533) can be made available to an analog circuit incorporated into block 529 which adds an appropriate amount of delay to the rising and falling edges of generated output clock 517 based on least significant bits output (block 533). The added delay would be adjusted every time an output clock edge is generated. In this embodiment, the amount of jitter on generated clock 517 would then be dependent on the number of least significant bits, and the delay resolution of the analog circuit.

Figure 9:
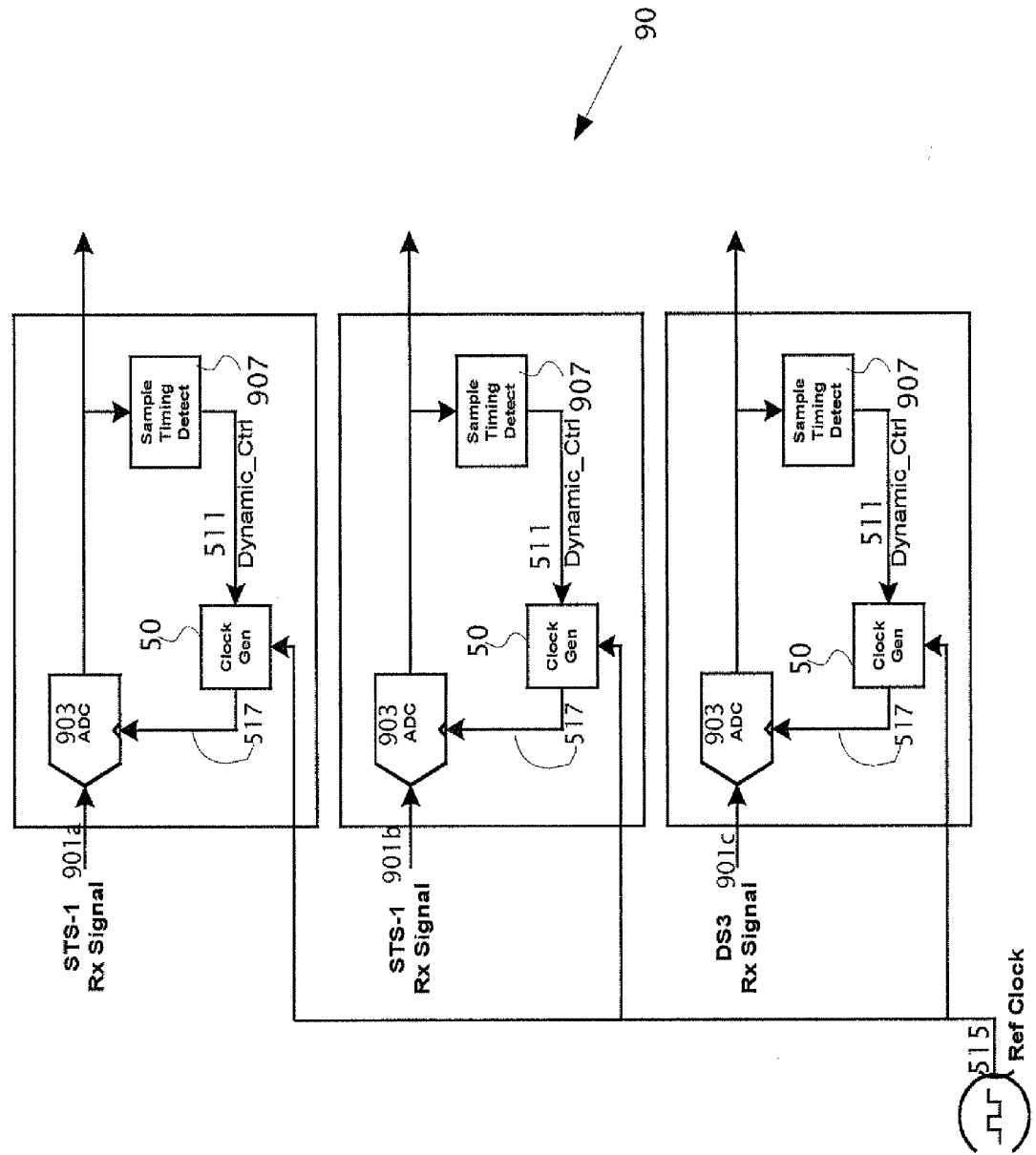
FIG. 9 is a simplified system diagram illustrating an embodiment according to the present invention, of a multiport data communications receiver.

An Embodiment of the Pulse Output DDS: Multi-Port Data Communications Receiver Reference is now made to FIG. 9 which illustrates an embodiment according to the present invention, applied to a multi-port data communications receiver in which each port can receives a data stream at distinctly different rates, and/or at rates that are only slightly different (i.e., plesiochronous). The specific example illustrated in FIG. 9 is a digital processing based multi-port DS3/E3/STS-1 Line Interface Unit (LIU) 90. Multiple signals 901a, 901b and 901c are received over respective coaxial cables and are each sampled with an analog-to-digital converter (ADC 903). The sampled signal is then processed by a digital processing circuit 907 that estimates the alignment of the ADC sampling instances relative to the desired ideal instances and adjusts dynamic control value 511 higher or lower to cause an ADC clock generator circuit 50 to output a slightly higher or lower frequency clock 51. The combined operation of ADC 903, digital processing circuit 907, and clock generator 50 causes the ADC sampling clocks 517 to become frequency and phase locked to the respective received signals 901.

It is important to recognize that in embodiment 90, there are multiple parallel ports, each receiving a signal 901 with a different signaling rate. For example, the first port is receiving signal 901a corresponding to the STS-1 signaling rate. The second port is also receiving signal 901b corresponding to the STS-1 signaling rate, but the exact rate is slightly different (i.e. plesiochronous) to the first port. The third port is receiving a signal 901c corresponding to the DS3 signaling rate. All three ports, however, have a clock generator that is based on reference clock 515 having a frequency that is independent of all three receive ports.

While the invention has been described with respect to a limited number of embodiments, it will be appreciated that many variations, modifications and other applications of the invention may be made.

What is claimed is:

1. A clock signal generator responsive to a frequency control word and a reference clock signal having a reference clock frequency $f_{ref}$, the clock signal generator generating an output clock signal having a frequency $f_{gen}$, wherein $f_{gen}$ is less than $f_{ref}$, the clock signal generator comprising:
   (a) a modulo-N counter which accepts the reference clock signal as input, said modulo-N counter generating a phase-indication signal of the reference clock, wherein said phase indication signal has N clock phases repeating at a frequency of $f_{ref}/N$;
   (b) an accumulator which by iteratively accumulating a frequency control word into a modulo-N adder, produces an accumulated value, wherein at least one bit of said accumulated value is fed-back into said modulo-N adder for adding modulo N to said accumulated value in the next iteration;
   wherein N of said modulo-N adder is the same integer as in said modulo-N counter; and
   (c) a clock edge selector which receives as inputs said phase indication signal and at least one bit of said accumulated value and by comparing said inputs selects an edge of the reference clock signal upon which to toggle the state of the output clock signal.

2. The clock signal generator, according to claim 1, wherein said clock edge selector selects said edge from: (i) only rising edges of the reference clock signal, (ii) only falling edges of the reference clock signal or (iii) both rising and falling edges of the reference clock signal.

3. The clock signal generator, according to claim 1, wherein said clock edge selector selects between a rising edge and a falling edge of the reference clock signal based on at least one bit of said accumulated value.

4. The clock signal generator, according to claim 1, further comprising:
   (d) an analog circuit operatively connected to said clock edge selector which corrects jitter of the output clock signal based on at least one bit of said accumulated value.

5. The clock signal generator, according to claim 1, wherein the frequency control word includes a dynamic control value, the clock signal generator further comprising:
   (d) a dynamic control interface operatively connected to said accumulator for inputting the dynamic control value, thereby dynamically controlling output clock frequency $f_{gen}$.

6. The clock signal generator, according to claim 5, wherein said dynamic control interface is an asynchronous interface, the clock signal generator further comprising:
   (e) a timing module operatively attached to said accumulator which times input of said dynamic control value into said accumulator thereby removing external timing requirements.

7. The clock signal generator, according to claim 1, whereby an increase of the value of N, decreases the minimum achievable output clock frequency $f_{gen}$ without affecting the absolute jitter in the output clock signal.

8. A system comprising a plurality of clock signal generators of claim 1, wherein the same reference clock signal is used for all the clock signal generators.

9. A receiver comprising a clock signal generator of claim 1.

10. A method for generating an output clock signal responsive to a frequency control word and a reference clock signal having a reference clock frequency $f_{ref}$, the output clock signal having a frequency $f_{gen}$, wherein $f_{gen}$ is less than $f_{ref}$, the method comprising the steps of:
   (a) inputting the reference clock signal into a modulo-N counter thereby generating a phase-indication signal of the reference clock, wherein said phase indication signal has N clock phases repeating at a frequency of $f_{ref}/N$;
   (b) iteratively accumulating a frequency control word into a modulo-N adder, thereby producing an accumulated value;
   (c) feeding back at least one bit of said accumulated value into said modulo-N adder for adding modulo N to said accumulated value in the next iteration;
   (d) receiving as inputs said phase indication signal and at least one bit of said accumulated value;
   (e) upon comparing said inputs selecting an edge of the reference clock signal for toggling the state of the output clock signal; and
   (f) toggling the state of the output clock signal on the selected edge of the reference clock signal.

11. The method, according to claim 10, further comprising the step of:
   (g) upon completing said toggling, initiating another iteration of said accumulating.

12. The method, according to claim 10, wherein the frequency control word includes a dynamic control value, further comprising the step of:
   (g) dynamically adjusting output clock frequency $f_{gen}$ by varying said dynamic control value.

13. The method according to claim 12, wherein said dynamically adjusting output clock frequency $f_{gen}$ includes dithering said output clock frequency $f_{gen}$ thereby substantially reducing spurious noise of the output clock signal.

14. The method, according to claim 12, further comprising the step of:
   (g) scaling said dynamic control value with a scaling factor between zero and one.

15. A multiple-port communications receiver comprising a plurality of receivers sharing a single reference clock signal having a reference clock frequency $f_{ref}$, each of said receivers including:
   (i) an analog-to-digital converter which receives and samples an input analog signal thereby generating an input digital signal;
   (ii) a timing detection circuit which processes said input digital signal and outputs dynamically a dynamic control value; and
   (iii) a clock signal generator responsive to said dynamic control value which outputs an output clock signal having a frequency $f_{gen}$, wherein $f_{gen}$ is less than $f_{ref}$, the clock signal generator including:
      (A) a modulo-N counter which accepts the reference clock signal as input, said modulo-N counter generating a phase-indication signal of the reference clock, wherein said phase indication signal has N clock phases repeating at a frequency of $f_{ref}/N$;
      (B) an accumulator which by iteratively accumulating a frequency control value which includes said dynamic control value into a modulo-N adder, produces an accumulated value, wherein at least one bit of said accumulated value is fed-back into said modulo-N adder for adding modulo N to said accumulated value in the next iteration;

wherein N of said modulo-N adder is the same integer as in said modulo-N counter; and (C) a clock edge selector which receives as inputs said phase indication signal and at least one bit of said accumulated value and by comparing said inputs selects an edge of the reference clock signal upon which to toggle the state of the output clock signal; wherein said output clock signal is input to said analog-to-digital converter, whereby sampling of said analog-to-digital converter is frequency and phase locked to said input digital signal.

* * * * *